US012775137B2

(12) United States Patent
Miri et al.

(10) Patent No.: US 12,775,137 B2
(45) Date of Patent: Oct. 27, 2026

(54) PROGRAMMABLE UNIVERSAL PHOTONIC ARRAY

(71) Applicant: Research Foundation of the City University of New York, New York, NY (US)

(72) Inventors: Mohammad-Ali Miri, Plainview, NY (US); Matthew Markowitz, Brooklyn, NY (US)

(73) Assignee: Research Foundation of the City University of New York, New York, NY (US)

( * ) Notice: Subject to any disclaimer, the term of this patent is extended or adjusted under 35 U.S.C. 154(b) by 300 days.

(21) Appl. No.: 18/597,330

(22) Filed: Mar. 6, 2024

(65) Prior Publication Data

US 2026/0079304 A1 Mar. 19, 2026

Related U.S. Application Data

(60) Provisional application No. 63/488,666, filed on Mar. 6, 2023.

(51) Int. Cl.

*G02B 6/126* (2006.01)
*G02B 6/293* (2006.01)

(52) U.S. Cl.

CPC .......... *G02B 6/126* (2013.01); *G02B 6/29332* (2013.01)

(58) Field of Classification Search

None
See application file for complete search history.

(56) References Cited

U.S. PATENT DOCUMENTS

| | | | | |
|---|---|---|---|---|
| 8,027,587 | B1 | 9/2011 | Watts | |
| 10,877,287 | B2 | 12/2020 | Miller | |
| 11,500,410 | B1 * | 11/2022 | Nahmias | G06E 1/045 |
| 12,033,065 | B2 * | 7/2024 | Kenney | G06F 17/16 |
| 2011/0151361 | A1 * | 6/2011 | Takahashi | G03F 1/36 430/30 |
| 2015/0354938 | A1 | 12/2015 | Mower et al. | |
| 2016/0112226 | A1 * | 4/2016 | Martinez | H03C 3/12 455/110 |

(Continued)

OTHER PUBLICATIONS

Miller, D.; Self-aligning universal beam coupler; Optical Society of America; Mar. 6, 2013; 11 pages; vol. 21, No. 5.

Reck, M. et al.; Experimental Realization of Any Discrete Unitary Operator; Physical Review Letters; Jul. 4, 1994; 6 pages; vol. 73, No. 1.

Goodman, J. et al.; Fully parallel, high-speed incoherent optical method for performing discrete Fourier transforms; Optics Letters; Jan. 1978; pp. 1-3; vol. 2, No. 1.

(Continued)

*Primary Examiner* — Jerry Rahll

(74) *Attorney, Agent, or Firm* — Schmeiser Olsen, PLLC

(57) ABSTRACT

A mjuniversal photonic apparatus that performs an arbitrary discrete linear unitary operation on a source of light comprises a plurality of waveguides, including: a plurality of input ports that receive a plurality of first optical signals from a light source; a plurality of channels positioned in parallel for transmitting the first optical signals along a length of the waveguides; and a plurality of output ports for outputting second optical signals generated from the first optical signals according to a matrix operation; and a plurality of phase shifters constructed and arranged in a cascade structure at the plurality of channels of the waveguides. The matrix operation includes a unitary transformation matrix factorized into a plurality of interlaced discrete fractional Fourier transforms (DFrFT) layers and parameter diagonal phase shift layers.

10 Claims, 15 Drawing Sheets

(56) References Cited

U.S. PATENT DOCUMENTS

| | | | | |
|---|---|---|---|---|
| 2016/0245639 | A1 | 8/2016 | Mower et al. | |
| 2016/0277119 | A1* | 9/2016 | Sinsky | H04B 10/674 |
| 2021/0063645 | A1* | 3/2021 | Lin | G06E 3/005 |
| 2021/0097421 | A1* | 4/2021 | Dhand | G06E 3/008 |
| 2021/0132650 | A1 | 5/2021 | Lin et al. | |
| 2021/0133547 | A1* | 5/2021 | Lin | G06N 3/067 |
| 2021/0135764 | A1* | 5/2021 | Lin | H04B 10/516 |
| 2021/0325924 | A1 | 10/2021 | Cable | |
| 2022/0171133 | A1 | 6/2022 | Smith et al. | |
| 2022/0269972 | A1* | 8/2022 | Bandyopadhyay | G06N 10/40 |
| 2022/0397383 | A1* | 12/2022 | Hamerly | G01B 9/0207 |
| 2023/0081903 | A1* | 3/2023 | Yuan | G06N 10/20<br>706/62 |
| 2023/0104033 | A1* | 4/2023 | Pleros | G02B 6/1225<br>385/3 |

OTHER PUBLICATIONS

Goto, N. et al.; Integrated optic matrix-vector multiplier using multifrequency acoustooptic Bragg diffraction; Applied Optics; Feb. 10, 1991; pp. 523-530; vol. 30, No. 5.

Gruber, M. et al.; Planar-integrated optical vector-matrix multiplier; Applied Optics; Oct. 10, 2000; pp. 5367-5373; vol. 39, No. 29.

Markowitz, M. et al.: Universal Programmable Photonic Circuits by Interlacing Discrete Fractional Fourier Transform and Phase Modulation; Jul. 14, 2023; 5 pgs; https://doi.org/10.48550/arXiv.2307.07101.

Markowitz, M. et al.: Auto-calibrating universal programmable photonic circuits: hardware error-correction and defect resilience; Optics Express, v 31, No. 23 pp. 37673-37682, Nov. 6, 2023.

* cited by examiner

PROGRAMMABLE UNIVERSAL PHOTONIC ARRAY

RELATED APPLICATIONS

This application claims priority to U.S. Provisional Application Ser. No. 63/488,666 filed Mar. 6, 2023, entitled "PROGRAMMABLE UNIVERSAL PHOTONIC ARRAY," the entirety of which is incorporated by reference herein.

STATEMENT REGARDING FEDERALLY FUNDED RESEARCH OR DEVELOPMENT

This invention was made with government support under grant number FA9550-22-1-0189 awarded by the Air Force Office of Scientific Research. The government has certain rights in the invention.

FIELD

The present concepts relate generally to photonic devices, and more specifically, to a universal programmable photonic circuit.

BACKGROUND

Advances in deep learning technology warrant an increased demand in computing power. A programmable universal linear optical component that can perform arbitrary discrete unitary operations on modulated light is an important component for classical and quantum optical information processing. Such a component can provide a platform for multistate systems of quantum particles for quantum computation and quantum information processing. In traditional optical computing environments, an integrated matrix-vector multiplier is a key element for developing photonic chips and realizing photonic artificial networks. These multipliers when implemented in neural networks with photonic circuits can intrinsically function as a universal multiport feedforward optical device with a wide range of applications such as integrated switching, filtering, and mode division multiplexing/demultiplexing, and the like. This becomes particularly important when an optical device becomes reconfigurable, which is useful for a wide range of applications from classical and quantum information processing to sensing, communications, analog signal processing, metrology, or other science and quantum technologies.

SUMMARY

In an aspect of the present inventive concept, a universal photonic apparatus that performs an arbitrary discrete linear unitary operation on a source of light comprises a plurality of waveguides, including: a plurality of input ports that receive a plurality of first optical signals from a light source; a plurality of channels positioned in parallel for transmitting the first optical signals along a length of the waveguides; and a plurality of output ports for outputting second optical signals generated from the first optical signals according to a matrix operation; and a plurality of phase shifters constructed and arranged in a cascade structure at the plurality of channels of the waveguides. The matrix operation includes a unitary transformation matrix factorized into a plurality of interlaced discrete fractional Fourier transforms (DFrFT) layers and parameter diagonal phase shift layers.

In another aspect, an N-port system comprises a plurality of N ports; a plurality of DFrFTs; and a plurality of diagonal phase shifts, wherein the diagonal phase shifts and DFrFTs are arranged as alternating layers.

In another aspect, a photonic integrated circuit comprises a plurality of (N+1) phase shifter arrays each comprising N phase shifters; a plurality of (N+2) waveguide arrays comprising N optical dielectric waveguides that are positioned in parallel and in proximity such that light from each optical dielectric waveguide evanescently couples to adjacent optical dielectric waveguides, the optical dielectric waveguides each having a length (L) given by:

$$L = \frac{\pi}{2\kappa_0};$$

the proximity being such that coupling coefficients $\kappa_{i,i+1}$ between adjacent optical dielectric waveguides obeys:

$$\kappa_{i,i+1} = \frac{\kappa_0}{2}\sqrt{(N-i)i}, \text{ for } i = 1, \ldots, N-1;$$

where $\kappa_0$ is a reference coupling value for suitably scaling all coupling coefficients $\kappa_{i,i+1}$ and the length L. Each phase shifter in the plurality of phase shifters is directly cascaded with adjacent waveguide in the plurality of waveguides such that the phase shifters and waveguides alternate.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention. In the drawings.

DETAILED DESCRIPTION

Figure 1:
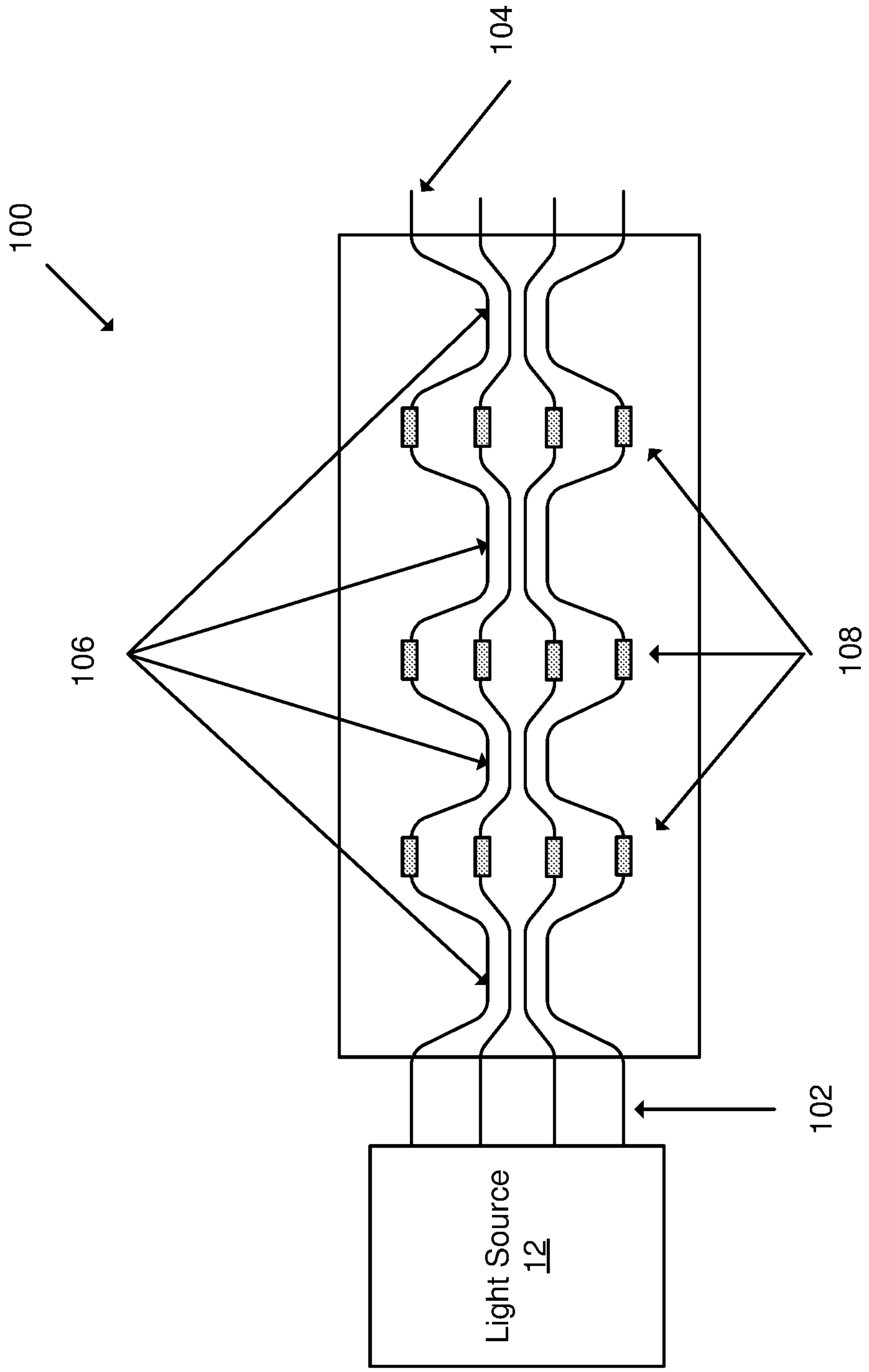
FIG. 1 is a schematic diagram of an optical device, in accordance with some embodiments.

The physical realization of a programmable photonic device that performs arbitrary unitary operations requires a suitable parameterization and factorization of unitary matrices into matrix factors with desirably fewer parameters that can be effectively implemented with photonic components Such factorization has been recursively utilized for representing unitary operators in a feedforward triangular mesh architecture of beam splitters and phase shifters. This can be implemented with integrated photonic components, resulting in programmable circuits which for an N×N unitary matrix require phase shifters and inherently bulky Mach-Zehnder interferometers. It is shown that an alternative arrangement of the underlying beam splitters and phase shifters through a rectangular architecture reduces the overall length of the design. On the other hand, it is shown that N×N unitary operations can be universally realized through a fundamentally different architecture that is built on cascading N-point discrete Fourier transforms (DFT) with arrays of N phase shifters. However, an on-chip implementation of DFT is difficult and requires bulky multimode interference (MMI) devices that result into large device lengths.

In brief overview, embodiments of the present inventive concept relate to a novel architecture for realizing unitary discrete linear operators and the parameterization of complex unitary matrices that allows for the efficient photonic implementation of arbitrary linear discrete unitary operators. The architecture is built on factorizing an N×N unitary matrix into interlaced, or alternating, discrete fractional Fourier transforms (DFrFT) and N parameter diagonal phase shifts. The configuration can represent arbitrary unitary operators with N+1 layers of phase modulation. The universality of this architecture is investigated numerically by considering the norm of representation error versus the number of phase layers which results in an abrupt phase transition at N+1 layers.

In some embodiments, a gradient-based algorithm is implemented for finding the optimal phase parameters for implementing a given unitary matrix. By increasing the number of phase layers beyond the critical value of N+1, the optimization consistently converges faster as the system becomes over-determined. The architecture exhibits resilience to mild manufacturing defects on the DFrFT layers and faulty phase shifters, which could otherwise compromise its functionality. This is henceforth called as the architecture self-calibration property, and it allows for compensating errors by only tuning the underlying phase parameters. In some embodiments, the architecture is implemented as an apparatus and/or system, in particular, an integrated photonic circuit comprising coupled waveguide arrays and reconfigurable phase modulator arrays. Applications may include programmable photonic circuits for optical classical and quantum information processing and for photonic accelerators of artificial intelligence.

In some embodiments, the mathematical factorization of an arbitrary matrix includes factorizing an N×N unitary matrix into interlaced discrete fractional Fourier transforms and N parameter diagonal phase shifts. These two interlaced operators may include Discrete Fractional Fourier Transform (DFrFT) and diagonal phase layers. In doing so, a universal programmable photonic circuit in some embodiments requires a plurality of waveguide lattices and phase modulators. For example, this may include a physical realization of the DFrFT matrix as a photonic lattice.

In some embodiments, the reconfigurable photonic integrated circuit can perform analog matrix-vector multiplications with light. A universal photonic device that can perform arbitrary linear operations is a desirable component of classical and quantum optical computing, while it also serves as a critical multiport circuit for advanced manipulation of light in photonic integrated circuits. As described above, one of the main limitations of the existing integrated photonic matrix multipliers is their relatively large (compared to the wavelength of light) feature sizes which prevents their scaling to large numbers of ports. The existing solutions are based on integrated Mach-Zehnder interferometers, which are inherently bulky elements. In contrast, a compact photonic circuit in accordance with some embodiments can perform arbitrary linear operations by dense packing of two building blocks, namely, waveguides and phase shifters. By utilizing this architecture, scalable and energy-efficient integrated photonic circuits are provided that can perform arbitrary complex linear operations with light. Furthermore, by incorporating tunable phase shifters programmable photonic circuits can be implemented for general-purpose applications.

FIG. 1 is a schematic diagram of an optical device 100, in which embodiments of the present inventive concept can be practiced. In some embodiments, the optical device 100 is a universal linear optical device 100 constructed and arranged to perform photonic matrix computations.

In some embodiments, the optical device 100 includes a plurality of evanescently coupled optical waveguides 106 and cascaded layers of phase elements 108 that modulate the phase of an optical signal as it travels through the phase shifter waveguides, and that are constructed and arranged in an array, for example, an N×N array formed of N input ports and N output ports, where N is an integer greater than 1. In some embodiments, the optical waveguides 106 and phase elements 108 are integrated into a single photonic chip and constructed and arranged for arbitrary linear operations. The optical waveguides 106 are coupled to a light source 12, or in some embodiments, a beam splitter. In some embodiments, the phase elements 108 are integrated into a single photonic chip that is electrically and optically interfaced for settings of the phase elements 108.

In some embodiments, the light source 12 encodes an input vector A to be multiplied. This is generated from a monochromatic light source injected into an array of Mach-Zehnder interferometer that splits the signal into the N required components of A. During operation, input vectors are loaded on a wavelength generated by the light source 12. The optical device 100 represents the unitary matrix that performs a matrix operation on the complex modal amplitudes of light at the input ports 102 to create the complex modal amplitudes of light at the output ports 104. The lengths of the waveguide layers and the phase of the phase shifters are predetermined so that the device can perform an arbitrary unitary matrix operation U (see Eq. 1 below).

Figure 2:
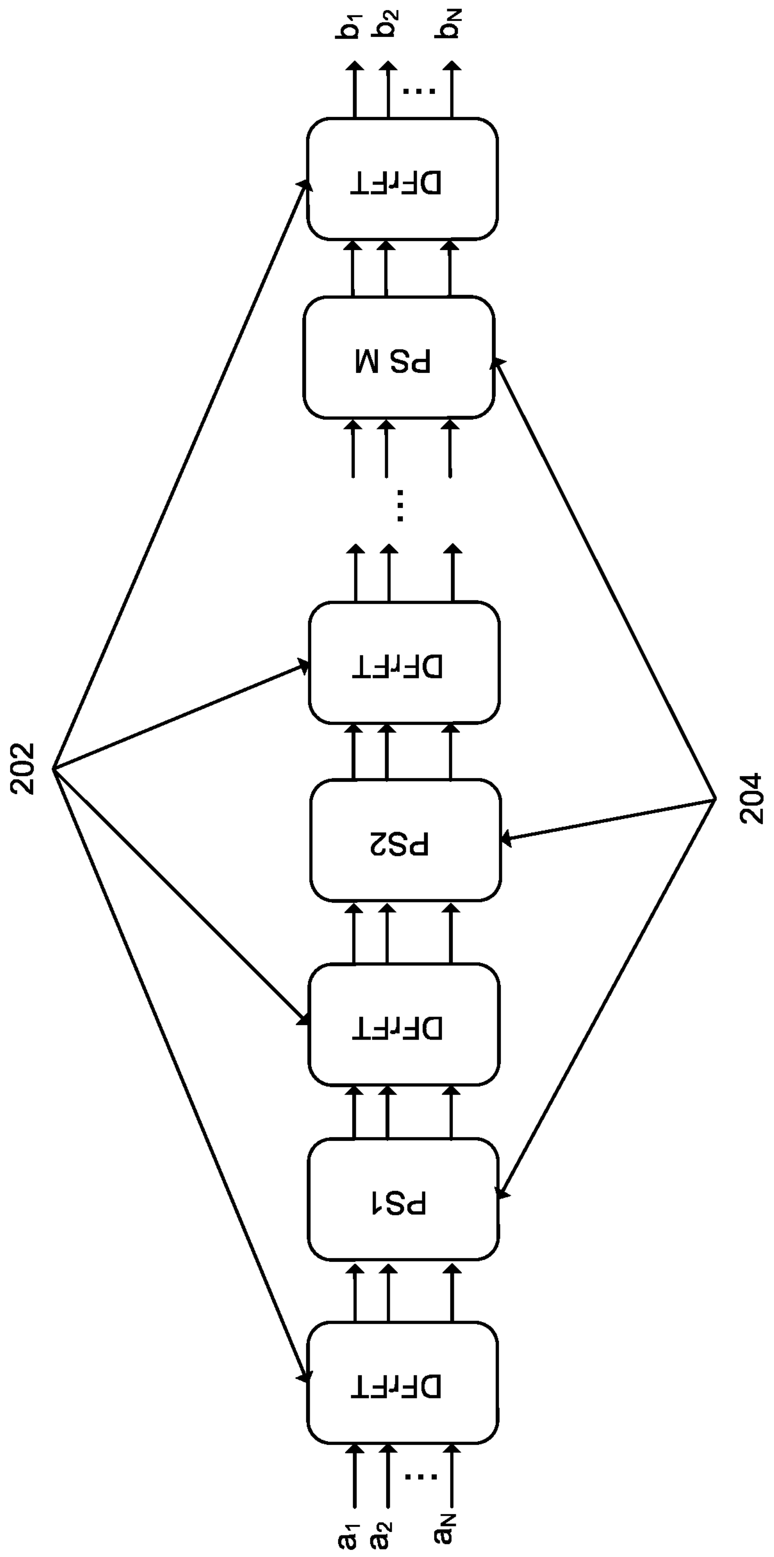
FIG. 2 is a schematic diagram of an N-port system architecture, in accordance with some embodiments.

The optical device 100 can be based on a mathematical factorization as shown schematically in FIG. 2. In this factorization, an arbitrary unitary N×N matrix, U, can be factorized as an interlaced sequence of Discrete Fractional Fourier Transform (DfrFT) operators 202 and diagonal phase matrices 204.

Figure 3:
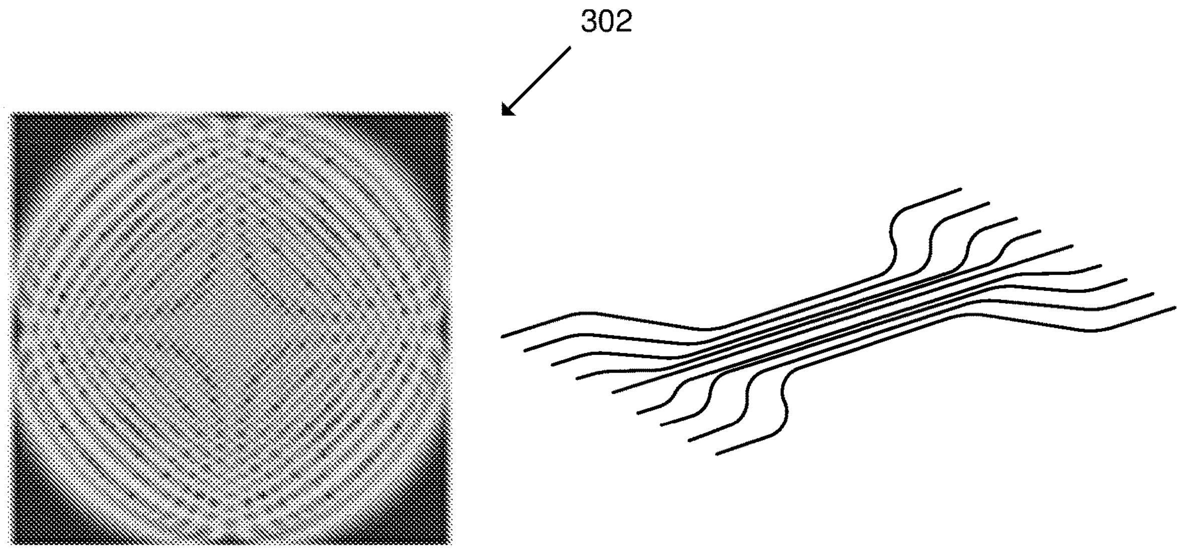
FIGS. 3 and 4 are diagrams illustrating matrix representations of DFrFT and PS operations and their physical realizations as integrated photonic components with respect to the DfrFT operators and phase shift matrices of FIG. 2.
Figure 4:
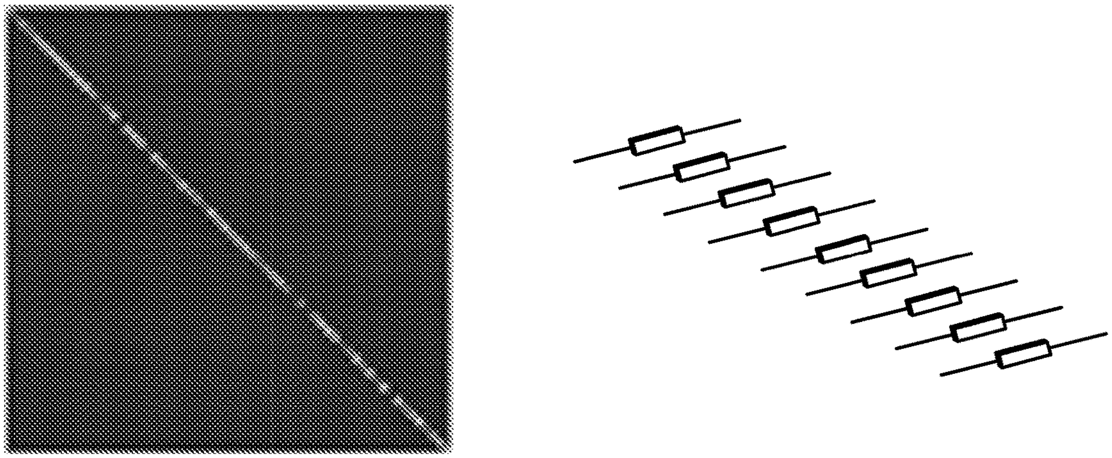

As described in FIG. 1, the device 100 has N input-output ports that performs an N×N matrix operation. Here, M layers of phase modulations (each containing N phase elements) are sandwiched between M+1 layers of DFrFT operators 202. The design is based on the hypothesis that an arbitrary unitary matrix can be decomposed into the following form with finite M:

$$U = FP_1F \ldots P_MF \tag{1}$$

where, the matrix F (referred to as a DFrFT matrix) represents the DFrFT operator 202 (see FIG. 3) that is defined as through the Jx Hamiltonian $$F = e^{i\frac{\pi}{2}H} \tag{2a}$$

$$H = \begin{bmatrix} 0 & \kappa_{1,2} & \ldots & 0 \\ \kappa_{1,2} & 0 & \ddots & \vdots \\ \vdots & \ddots & \ddots & \kappa_{N-1,N} \\ 0 & \ldots & \kappa_{N-1,N} & 0 \end{bmatrix} \tag{2b}$$

$$\kappa_{i,i+1} = \frac{1}{2}\sqrt{(N-i)i} \tag{2c}$$

and $P_m$ (m=1, . . . , M) are diagonal phase matrices (see FIG. 4) and describes the $m^{th}$ layer of the phase modulation, defined as:

$$P_m = \begin{bmatrix} e^{i\phi_1^m} & 0 & \ldots & 0 \\ 0 & e^{i\phi_2^m} & \ddots & \vdots \\ \vdots & \ddots & \ddots & \vdots \\ 0 & \ldots & \ldots & e^{i\phi_N^m} \end{bmatrix} \tag{3}$$

Here, $$\phi_n^m (n = 1, \ldots , N \text{ and } m = 1, \ldots , M)$$

may represent the phases imposed by the phase elements 204 and $$\phi_i^m$$

may represent the ith phase element in the mth layer of $$F = e^{i\frac{\pi}{2}H}$$

where His the Hamiltonian of the Jx lattice of equation (2a). Any unitary matrix can be represented in this form with a finite number of layers. In addition, the required number of phase layers for representing arbitrary unitary matrices is M=N+1.

Figure 5:
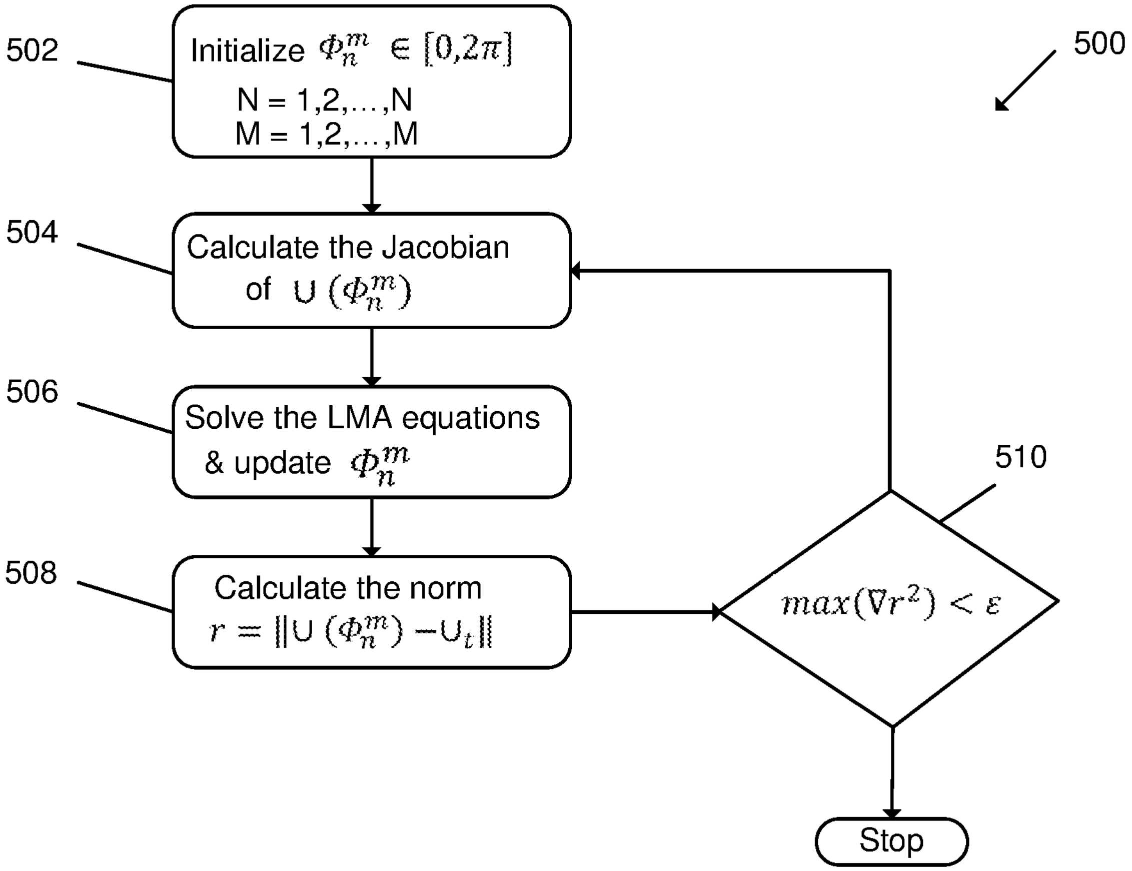
FIG. 5 is a flow diagram of a method for identifying unknown parameters for a large unitary matrix, in accordance with some embodiments.

FIG. 5 is a flow diagram of a method 500 for identifying parameters for large unitary matrix, in accordance with some embodiments. Shown is a workflow of the method 500 for a given N, M and $U_t$. Some or all of the method 500 can be performed by the optical device 100 of FIGS. 1-4.

At step 502, a plurality of phases $$\phi_n^m$$

are initialized between 0 and 2π by randomly assigning their values within their domain.

At step 504, the Jacobian of a transformation matrix $$U(\phi_n^m),$$

or the matrix of all its first-order partial derivatives, is calculated.

At step 506, a Levenberg-Marquardt algorithm (LMA) is executed, and the LMA equations are solved. By considering a given unitary matrix $U_t$ the gradient-based optimization framework is implemented using the LMA. An LMA is a well-known optimization algorithm which interpolates between gradient descent and Gauss-Newton, and is well suited to problems involving minimizing sums of squares. At step 508, an objective function is selected to be the square of the Frobenius norm $\|U(\phi)-U_t\|$ of the difference between the target matrix and the approximation produced by the ansatz of relation in equation (1). For the analysis, randomly chosen target unitary matrices (Ut) are generated in accordance with the Haar measure to appropriately sample the target space. At decision diamond 510, a determination is made whether a maximum iteration threshold is reached for a given run.

The method 500 when implemented shows that a general unitary matrix with up to N=4 can be approximated with the factorization of the form (1) while the error becomes arbitrarily small by increasing the number of optimization iterations. Assuming the existence of a factorization of the form (1), it also remains to develop a systematic technique for finding the parameters $$\phi_m^n$$

for a unitary matrix, which forms another key step of this effort. A recursive method can reduce the rank of the factorized elements. The gradient-descent method 500 may be inspired by backpropagation in feedforward neural networks that can be fast and efficient for finding the optimal parameters for large unitary matrices.

Figure 6:
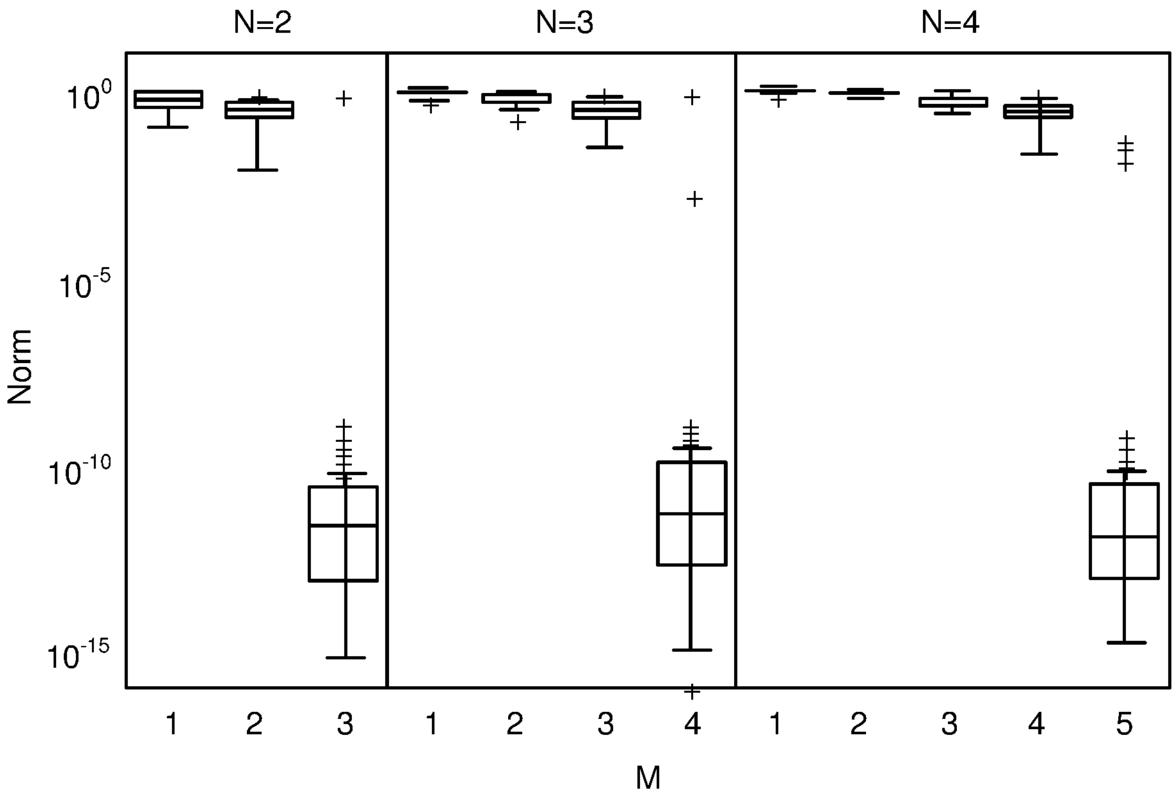
FIG. 6 is a graph illustrating the performance of an LMA for different dimensional matrices and layer numbers, in accordance with some embodiments.
Figure 7:
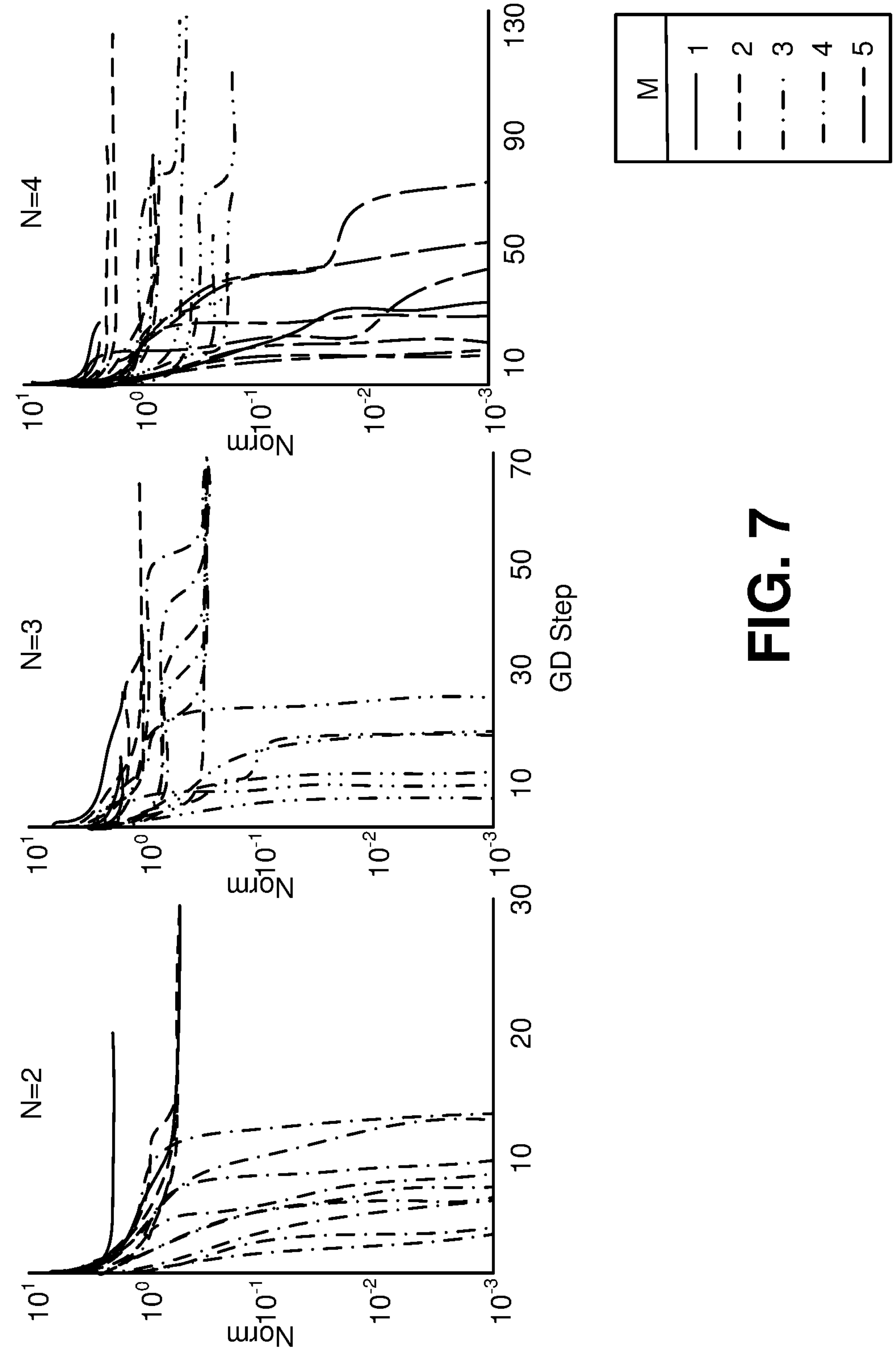
FIG. 7 is a graph illustrating a convergence of a norm (objective function) as a function of gradient descent step, in accordance with some embodiments.

FIG. 6 shows the norm for 100 randomly chosen targets $U_t$ for 2, 3 and 4 dimensional matrices and for different layer numbers M. As shown in FIG. 6, when the number of phase layers is M=N+1, the norm is dramatically reduced, and the LMA virtually always finds suitable phase layers to reproduce the target. Outliers in the case M=N+1 are found to disappear upon additional experiments with different initial phases. In FIG. 7, a single $U_t$ is chosen and the norm is plotted against the number of gradient descent steps for 10 different experiments. Altogether these two plots indicate the existence of a phase transition between M=N and M=N+1. This result is intuitive given the $N^2$ free parameters of $U_t$, but it is still surprising that a gradient descent-based algorithm can perform so well given the highly non-convex landscape.

Figure 8:
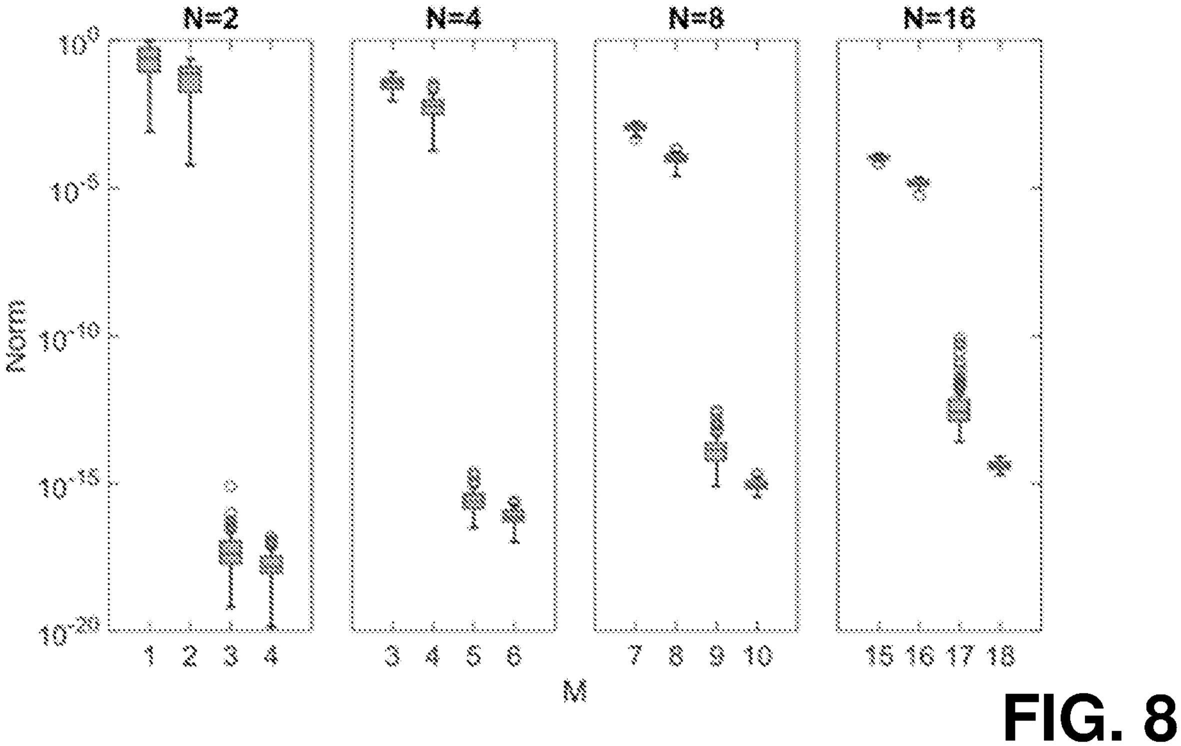
FIG. 8 is a graph illustrating the performance of an LMA for different dimensional matrices and layer numbers, in accordance with other embodiments.

As shown in FIG. 8, additional tests are performed for higher N values (e.g., N=8, 16), and confirms that the error norm decreases as the matrix order increases. In particular, the experimental data shows the error norm (mean square error of the optimization) for randomly generated target unitary matrices of sizes N=2, 4, 8, and 16. In each case, 100 target unitary matrices were generated, while for each target matrix, the optimization was run 100 times with different initial conditions for different number of phase layers M to get a single value of the lowest norm. In all cases, a phase transition is observed when the number of layers transit from M=N to M=N+1. In accordance with step 502 of the method 500, the phases here were randomly initialized between 0 and 2π. The LMA was run 100 times to find the parameters corresponding to the lowest error norm. In FIG. 8, for N=16, M=17, the experiment indicated that the number of runs must be increased to 1000 to obtain the lowest possible error norms.

In another example, a 3×3 (i.e., 3 inputs and 3 outputs) matrix was generated as follows:

$$F = \begin{bmatrix} 0.5 & 0.707i & -0.5 \\ 0.707i & 0 & 0.707i \\ -0.5 & 0.707i & 0.5 \end{bmatrix}$$

Given the randomly generated unitary matrix $$U_t = \begin{bmatrix} 0.369+0.501i & -0.501-0.019i & 0.520-0.302i \\ 0.022+0.703i & 0.289-0.124i & -0.577-0.273i \\ 0.151+0.310i & 0.451+0.669i & 0.279+0.391i \end{bmatrix}$$

and M=4 phase layers, the optimization procedure produced the 12 phases below. It is confirmed that this produces the target transformation (with the appropriate number of digits, the norm of the difference is on the order of 10e-28).

$$U_t \approx F\begin{bmatrix} e^{2.311i} & 0 & 0 \\ 0 & e^{4.599i} & 0 \\ 0 & 0 & e^{1.0632i} \end{bmatrix} F \begin{bmatrix} e^{3.222i} & 0 & 0 \\ 0 & e^{5.653i} & 0 \\ 0 & 0 & e^{7.592i} \end{bmatrix}$$
$$F\begin{bmatrix} e^{6.185i} & 0 & 0 \\ 0 & e^{3.858i} & 0 \\ 0 & 0 & e^{2.621i} \end{bmatrix} F \begin{bmatrix} e^{2.443i} & 0 & 0 \\ 0 & e^{5.039i} & 0 \\ 0 & 0 & e^{1.563i} \end{bmatrix} F$$

As described above, the two main building blocks of the photonic device 100 illustrated in FIG. 1 include a plurality of coupled waveguide arrays 106 and phase modulator arrays 108, which as shown in FIG. 2, allows a physical realization of the DFrFT with a particular photonic waveguide array and as a photonic lattice.

Figure 9:
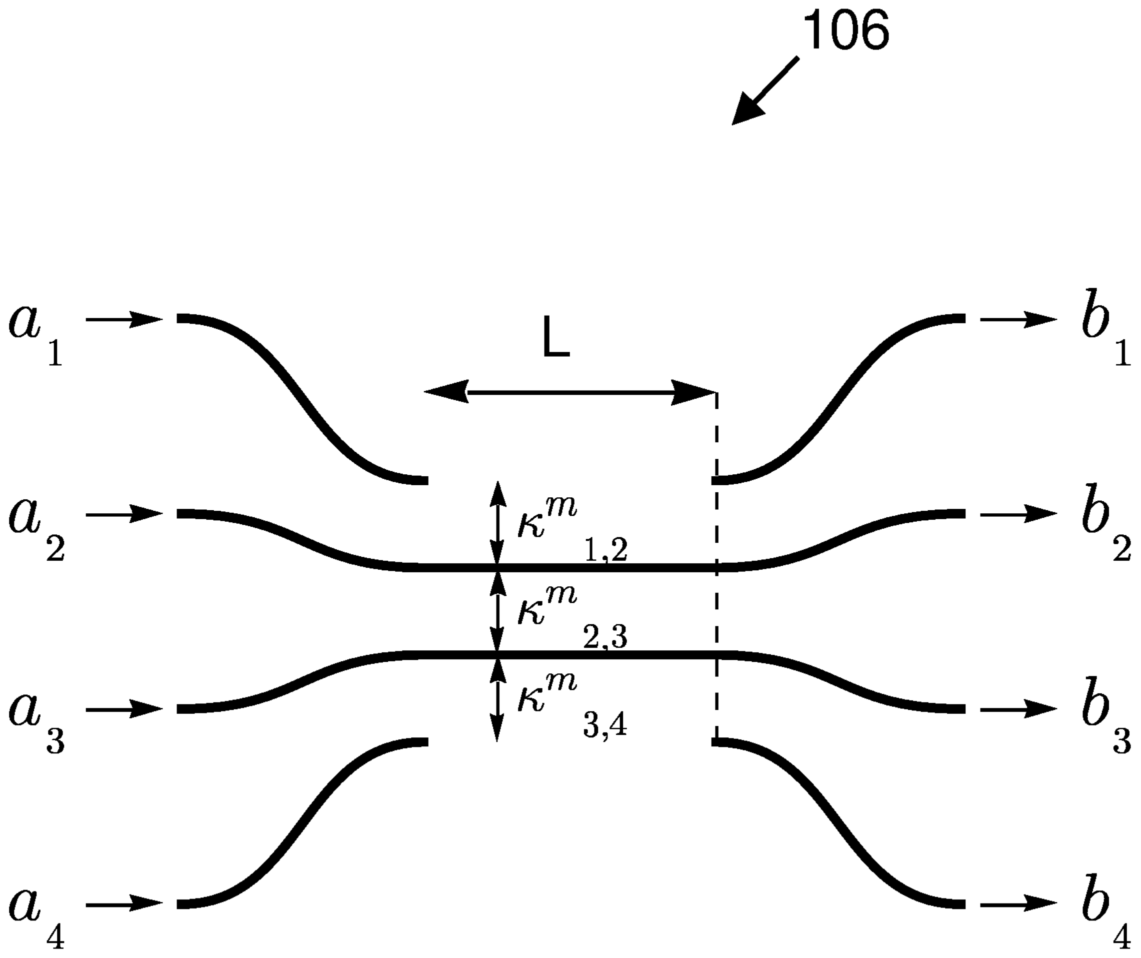
FIG. 9 is a schematic diagram of a waveguide array for achieving a Discrete Fractional Fourier Transform (DFrFT), in accordance with some embodiments.

As shown in FIG. 9, a waveguide array 106 may comprise a plurality of optical dielectric waveguides that are positioned in parallel and in proximity such that light from each channel can evanescently couple to adjacent channels. The coupling coefficient κ is between adjacent elements. To achieve the DFrFT matrix, the coupling coefficients in the waveguide array should obey:

$$\kappa_{i,i+1} = \frac{\kappa_0}{2}\sqrt{(N-i)i} \tag{4}$$

for i=1, . . . , N−1. Using identical single mode waveguides, it is possible to achieve this coupling by using different spacings between the waveguides. Furthermore, the length (L) of the waveguide array should be taken as:

$$L = \frac{\pi}{2\kappa_0} \tag{5}$$

to ensure that the transmission matrix of the waveguide array is the desired DFrFT as discussed before.

Figure 10:
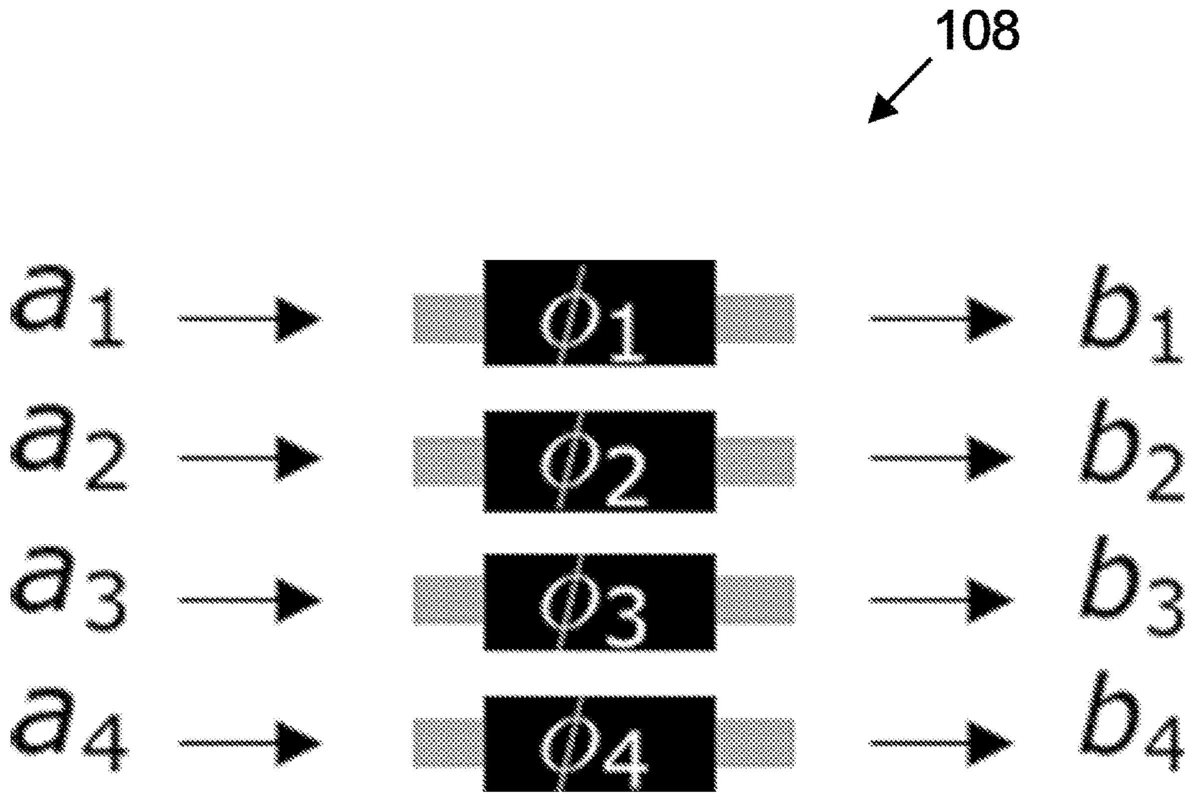
FIG. 10 is a schematic diagram of a phase shifter array, in accordance with some embodiments.

FIG. 10 schematically shows a phase shifter array 108 of FIG. 1. In some embodiments, the phase shifter array 108 includes a class of tunable (active) phase shifters that are controlled electrically via a programmable interface controller (not shown).

For a phase shifter array 108 the input-output relation is described through:

$$\begin{bmatrix} b_1 \\ b_2 \\ \vdots \\ b_N \end{bmatrix} = e^{iQ_m}\begin{bmatrix} a_1 \\ a_2 \\ \vdots \\ a_N \end{bmatrix}, \tag{6}$$

$$\text{where, } Q_m = \begin{bmatrix} \phi_1^m & 0 & \dots & 0 \\ 0 & \phi_2^m & \ddots & \vdots \\ \vdots & \ddots & \ddots & 0 \\ 0 & \dots & 0 & \phi_N^m \end{bmatrix}. \tag{7}$$

Referring again to FIG. 8, for a fixed relationship of the number of phase layers to the matrix order, it is shown that the error norm decreases as the latter increases. Depending on the desired accuracy, the special case M=N may therefore be feasible for implementing universal circuits at larger N. Notably however, between M=N and M=N+1 layers the error norm undergoes a phase transition. This suggests that N+1, rather than N layers, corresponds to the more fundamental universality requirement, despite being slightly overdetermined (with N (N+1) parameters). Preliminary tests with a larger number of trials were performed to produce experimental data to determine that these gaps do not significantly close. With 10,000 trial runs for (N=2,M=2), the lowest error norm was found to be $10^{-7}$. These phase transitions can also be found using other popular methods such as Simulated Annealing and Genetic Algorithm. As these are probabilistic methods, a secondary optimization will be necessary to fine-tune the parameters in the ambient space so that the abrupt transition in the error norm can become visible.

To better investigate the phase transitions, the error norm versus the optimization iteration step is shown in FIG. 7, once again using the best-case runs. For M>N, the norm of these runs varies slowly with the iteration step until a minimum is approached and there is an abrupt transition to a low value. In all cases, the error norm decreases as M increases, with M=N+2 layers consistently performing well and with few iteration steps, corresponding to quick optimization times.

Clearly, to efficiently utilize the proposed architecture, it is important to have a reliable optimization scheme for finding the phase parameters that allow representing a desired unitary matrix. This is especially important for LMA, which can get stuck for long periods of time tuning the norm in small neighborhoods.

Figure 11A:
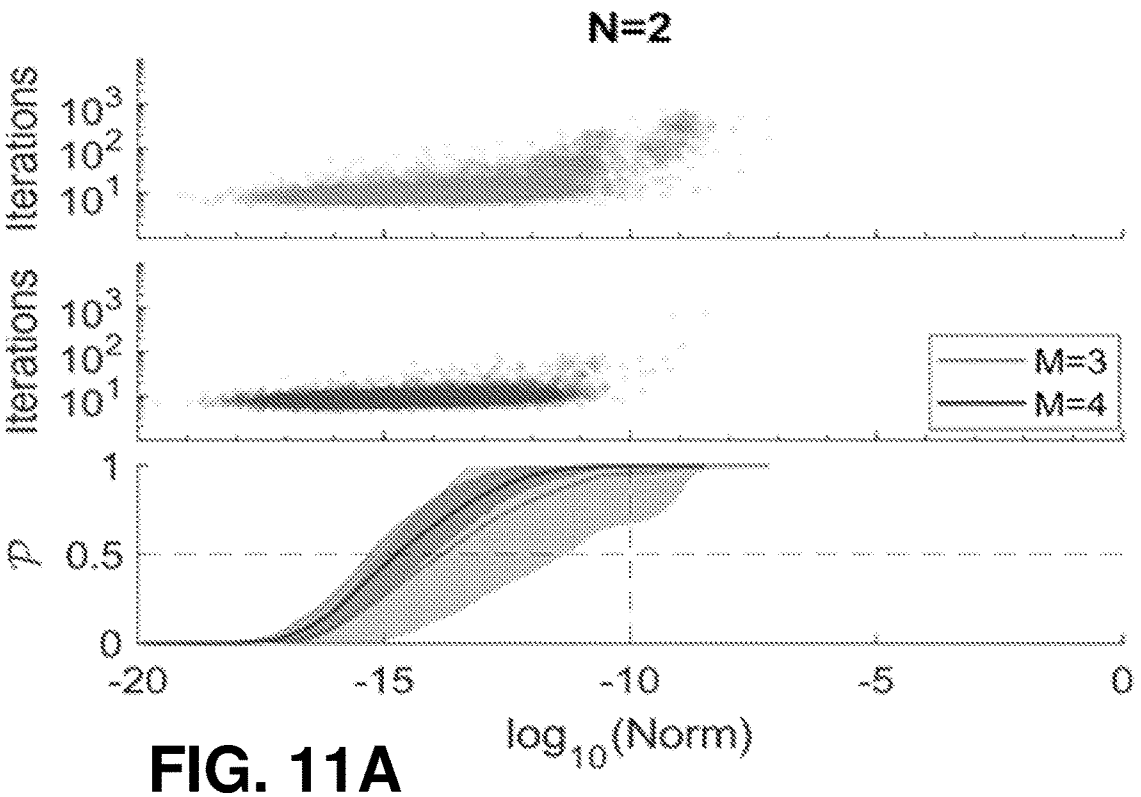
FIGS. 11A-11D are graphs illustrating a number of optimization iterations vs. a norm of error, used for estimating computation times, in accordance with some embodiments.
Figure 11B:
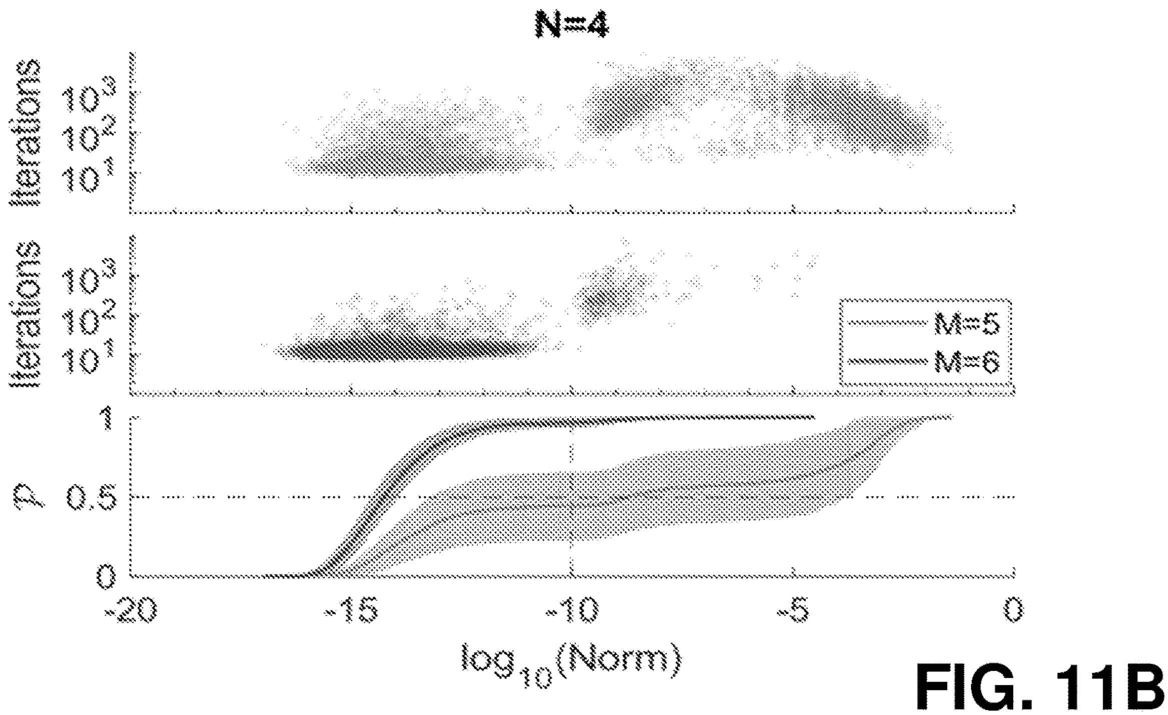
Figure 11C:
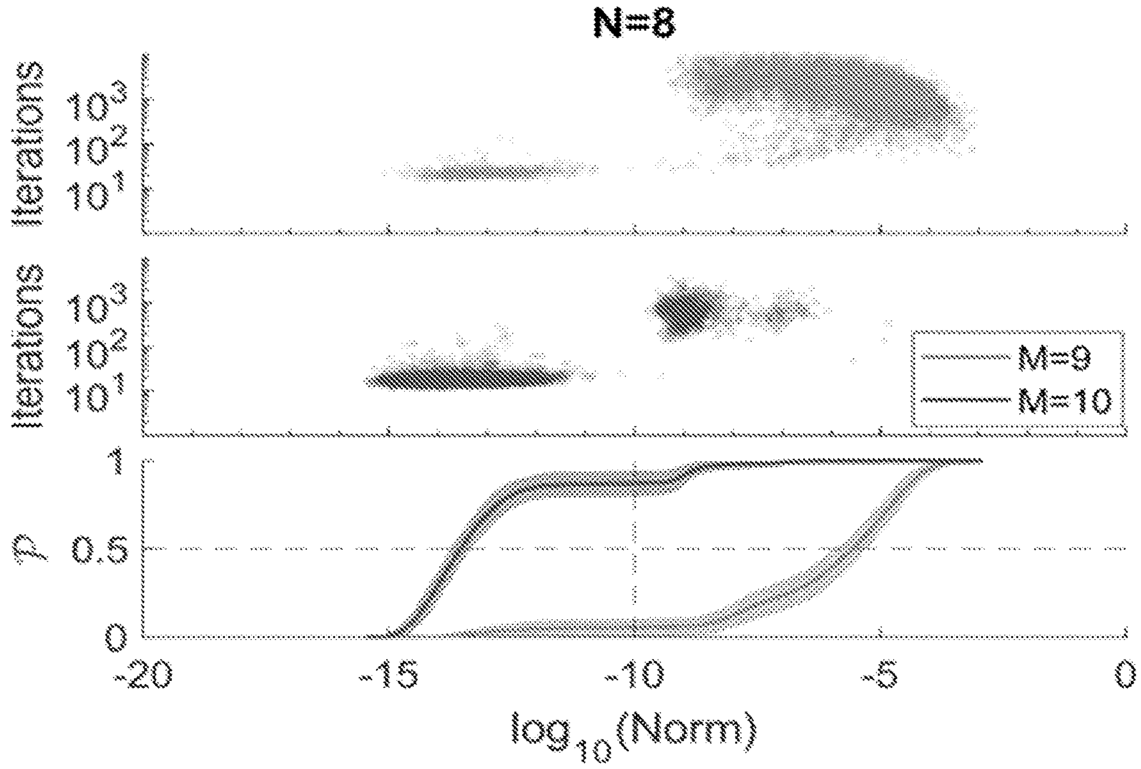
Figure 11D:
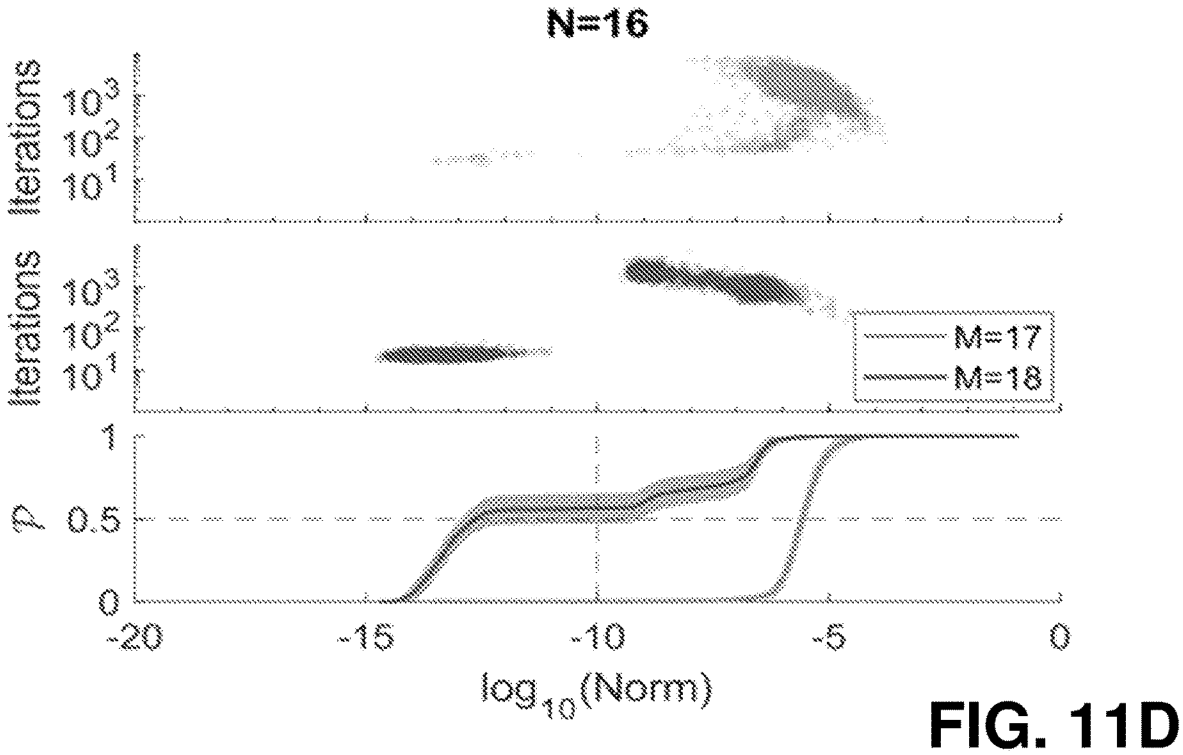

FIGS. 11A-11D show the number of iterations and norms of the 100×100 runs for M=N+1 and M=N+2. The number of optimization iterations versus the norm of error for the 100×100 runs with M=N+1 and M=N+2, which can be used to estimate computation times. FIGS. 11C and 11D show the cumulative probability of finding an error norm equal to or lower than a given value for a single run of LMA. Given that this cumulative probability depends on the target matrix, its distribution for many randomly generated target matrices is represented with shaded regions corresponding to +2 standard deviations.

As in FIG. 8, there is clear evidence of a phase transition around $L_c=10^{-10}$. Importantly, the number of iterations can differ by an order of magnitude or more depending on whether the norm of a single run converges below $L_c$. This suggests a modification of Levenberg-Marquardt with each run ending prematurely after a maximum iteration (or equivalently, time) threshold. The algorithm keeps performing trial runs until an error norm less than the critical value $L_c$ is achieved. The mean number of runs for this procedure can be deduced from the cumulative probability of the norms for a single run of LMA, shown in the plots of FIGS. 11C and 11D. The probability for a given norm decreases with N, but at N=16, there is still a 50% chance that with M=N+2 phase layers a norm of L. or lower will be achieved after a single run. For M=N+1, this probability is already low at N=8 (~1%), leading to much greater computation times. Extrapolating from these trends for N>16, M=N+3 or higher may be required to achieve similar results. Thus, although the choice of M=N+1 phase layers has been shown to allow universality, there is a limit on the practicality of finding the solutions for very large N, even with truncated LMA. However, we stress again that it may not be required in practice to find these sub-$L_c$ solutions. If for example an error norm of $10^{-5}$ is considered good enough, then at N=16 there is a ~90% chance of obtaining a lower norm using untruncated LMA.

In some embodiments, a sensitivity analysis of the device can be performed, considering the N+1 layers of DFrFT matrices in the system, each with a different random perturbation as discussed in Methods. For a given target matrix Un, first one may consider the exact DFrFT matrix F and calculate the phase parameters $$\theta_i^m.$$

Then, by considering the perturbed matrices $F_p$, the uncorrected phase parameters are used to construct the target matrix $U_t$ according to equation (1) above. In general, one may observe orders of magnitude increase in the error norm. Next, the phase parameters are optimized this time by considering the perturbed matrices $F_p$. One may observe that the representation error can reduce again to the numerical noise level.

Figure 12A:
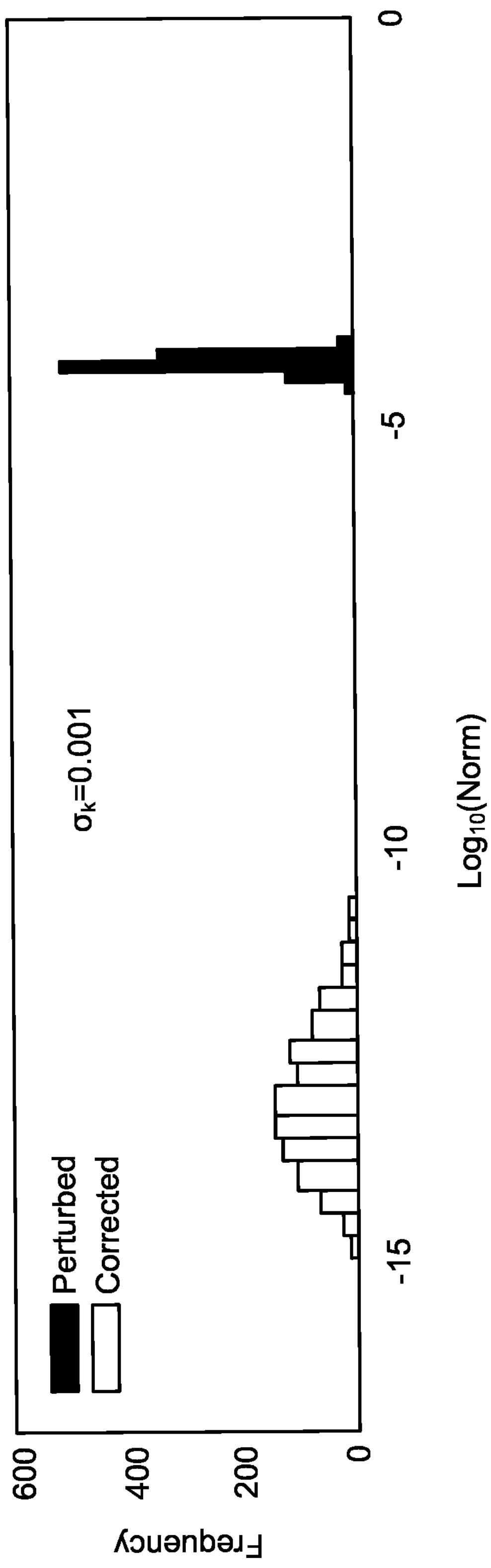
FIGS. 12A-12C are graphs of an auto-calibration property of a system for performing a parameterization of complex unitary matrices, in accordance with some embodiments.
Figure 12B:
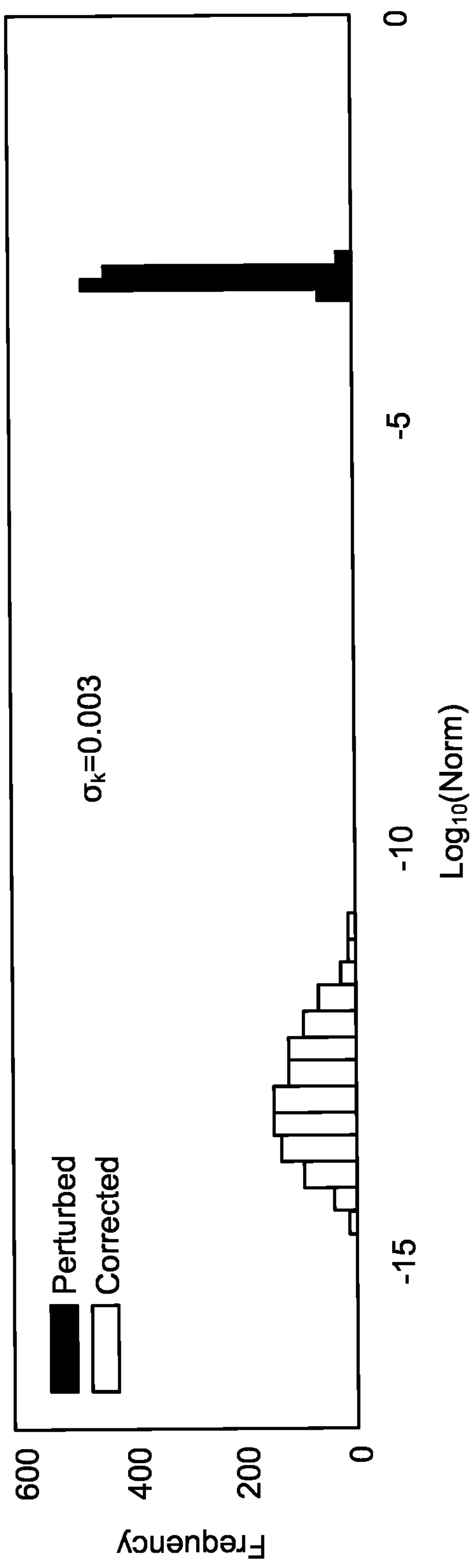
Figure 12C:
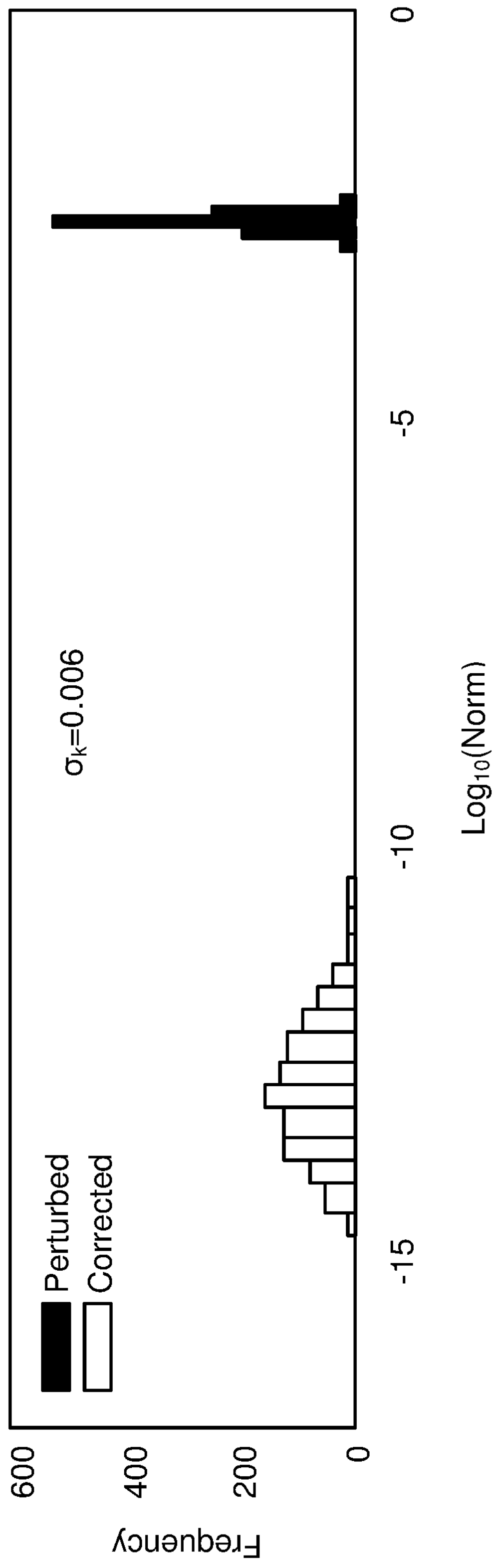

The results are illustrated in FIGS. 12A-12C, which are graphs of an auto-calibration property of a system for performing a parameterization of complex unitary matrices, for example, the system including a photonic device described in FIGS. 1 and 2. Here, 100 random target matrices, with N=8, are generated and a factorization with M=9 phase layers is considered. For each matrix, a search is performed for the optimal phase values 10 times with different sets of perturbed DFrFT matrices each time. The truncated LMA was used with a maximum of 50 iterations per run. For the values of the perturbation parameter ox tested, the truncated LMA was always able to find error norms below $10^{-10}$. This clearly demonstrates that the results on universality do not depend critically on the precise form of F. Accordingly, in a physical realization, fabrication errors in the DFrFT layers can be readily balanced post-fabrication by tuning the reconfigurable phase shifters to achieve a precise realization of a desired unitary matrix. As shown in the auto-configuration property illustrated in FIGS. 12A-12C, by perturbing the DFrFT matrices the error norm jumps to large values but after a second optimization, new phases are found which bring the error norms back to the numerical noise level. This analysis is done for (N=8,M=9), and by considering 100 random target matrices. Here, the parameter of characterizes the magnitude of the perturbations.

Accordingly, the systems and methods in accordance with embodiments of the present inventive concept include an architecture for the implementation of discrete linear unitary operators with photonic integrated circuits. The architecture is built on interlacing phase shifts with discrete fractional Fourier transforms. The foregoing numerical results indicate that this architecture can universally represent N×N unitary operations with at N+1 phase layers. The architecture offers a fairly simple physical realization by utilizing photonic waveguide arrays in conjunction with phase modulator arrays. In addition, the architecture exhibits auto-calibration properties which makes it invulnerable to fabrication errors.

In order to investigate the auto-calibration of the architecture, perturbations were considered in the DFrFT layers as discussed in the following. To perturb the F matrices, the Hamiltonian H is perturbed according to $H \rightarrow H_p=H+\sigma H_1$, while the perturbed DFrFT matrix $F_p$ is then obtained using $H_p$ according to equation (3) above. Alternatively, one can directly consider additive perturbations in the F matrix, but the former approach seems more reasonable considering the proposed physical realization of the DFrFT matrix as a photonic lattice. Here, $H_1$ is a Hermitian complex perturbation matrix with the real and imaginary parts of each entry drawn independently from N (0,1). The perturbation parameter is taken to be $\sigma=\sigma_k\kappa_{max}$, where $\kappa_{max}$ represents the largest coupling coefficient in relation (4), and $\sigma_k$ is a small number. The following table shows the numerically calculated mean errors in F and U for different values of the perturbation parameter $\sigma_k$.

| $\sigma_k$ | % Error F | % Error U |
|---|---|---|
| 0.001 | 0.76% | 2.41% |
| 0.003 | 2.28% | 7.20% |
| 0.006 | 4.55% | 14.40% |

The mean perturbation errors in F and the corresponding mean perturbation errors in U (when using uncorrected phases) for different values of ok. Here, the mean perturbations are $(\|F-F_p\|)/\|F\|$ and $(\|U_t-U_p\|)/\|U_t\|$, where $F_p$ is any one of the N+1 perturbed DFrFT matrices, and $U_p$ is the transformation matrix using the perturbed DFrFT matrices and the uncorrected phase parameters.

Figure 13A:
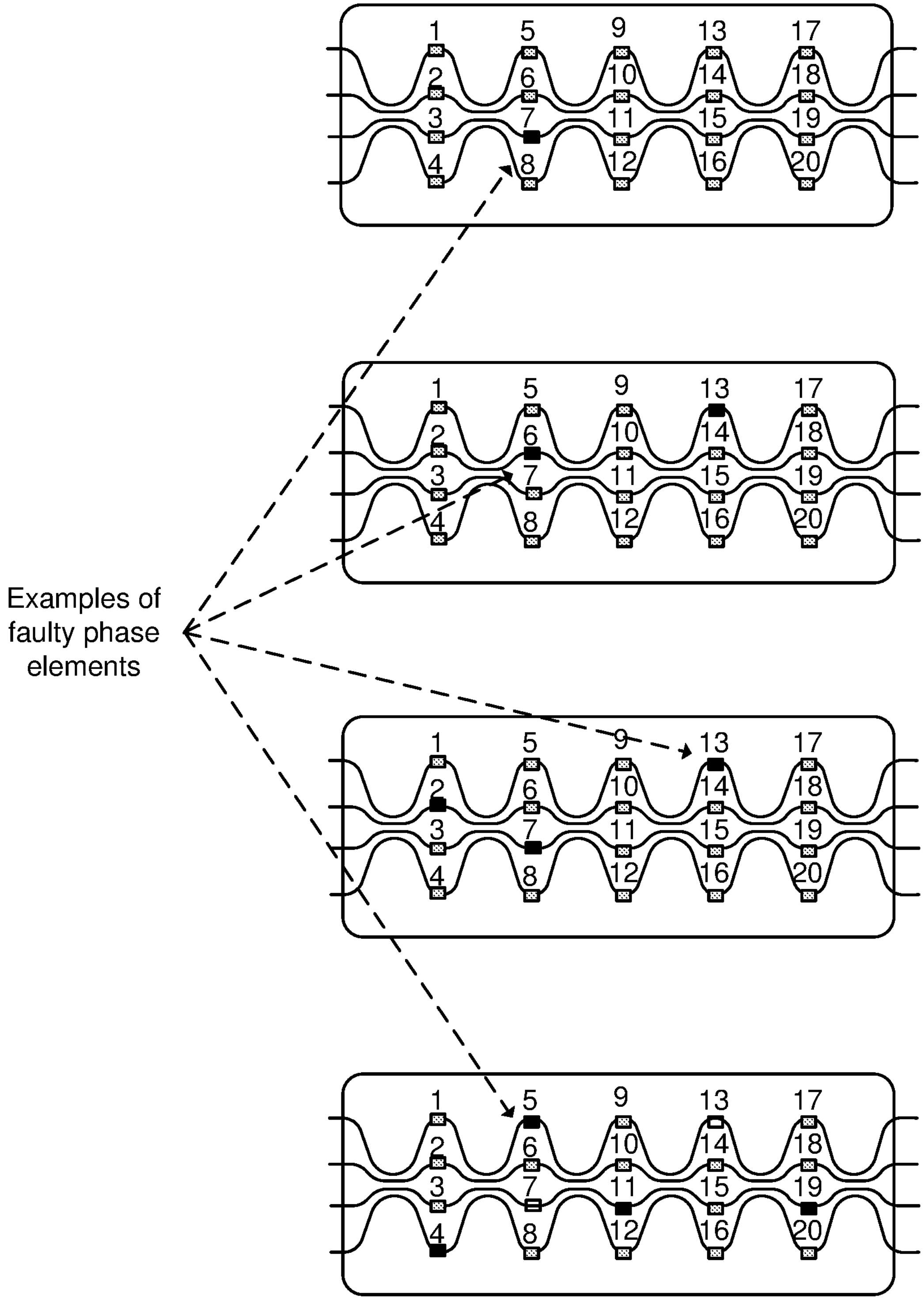
FIGS. 13A and 13B are views of data corresponding to faulty phase modulators.
Figure 13B:
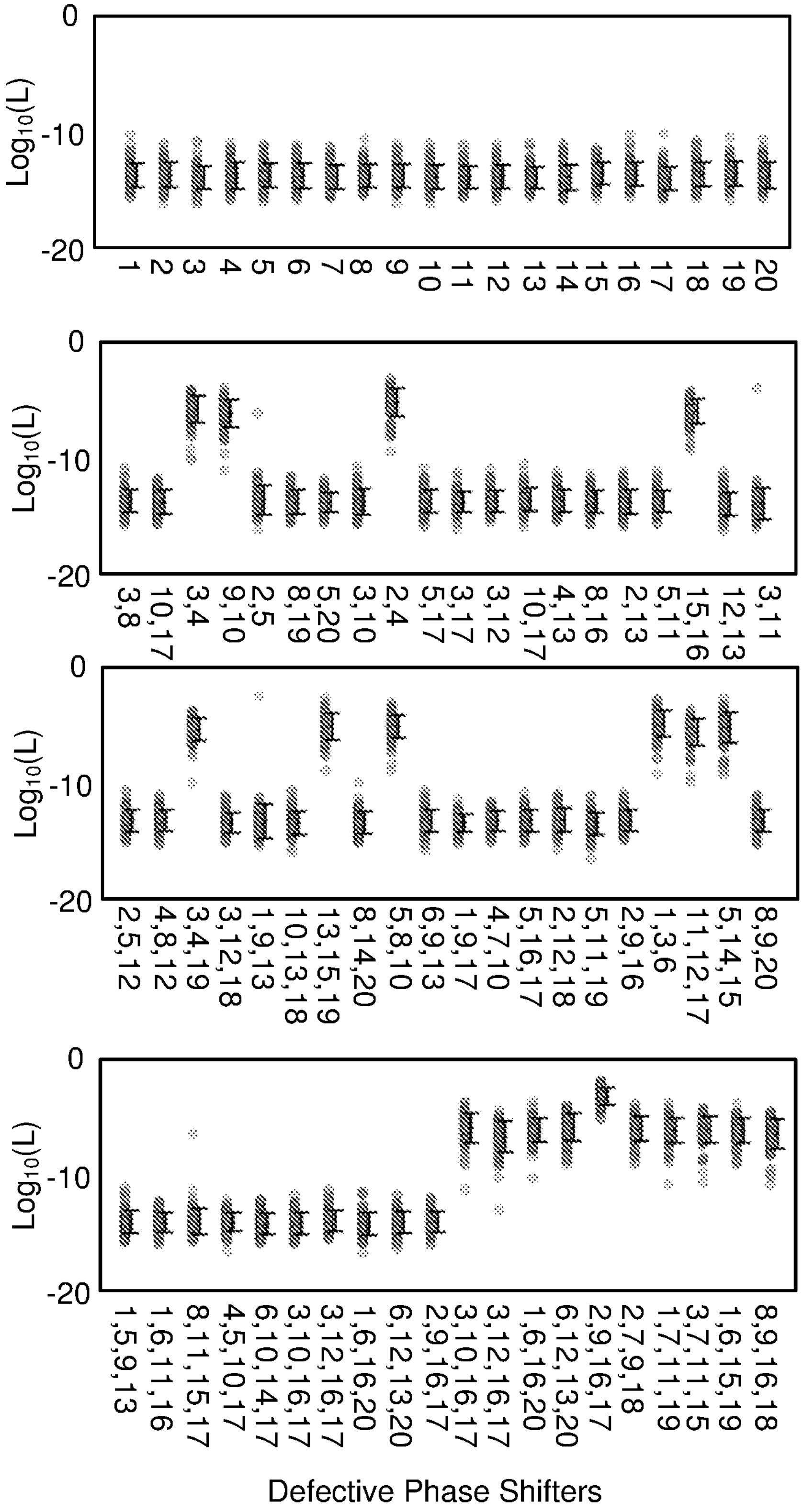

Further perturbations may appear in the architecture when the phase modulator elements 108 are either broken or incapable of performing the complete phase modulation task. In such faulty cases, the architecture can still perform the required matrix multiplication provided that, at most, one faulty phase modulator 108 per layer is present across a maximum of M−1 layers. This is illustrated in FIG. 13A, where the position of faulty phase modulators is indicated. The error of the reconstructed target is shown in FIG. 13B for different configurations of faulty elements, which brings numerical evidence of the architecture resilience to faulty phase modulators under the conditions stated above. This highlights another aspect of the device auto-calibration functionalities to reconstruct the target matrix using Eq. (1).

The inventive concept described herein has been intended to work on the optical frequency domain, where waveguide arrays are light carriers and also allow for coupling between neighboring elements. However, the concept is not limited to the optical frequency domain. Nevertheless, other embodiments of the inventive concept can apply to the microwave domain using microstrip lines suitable for microwave transport, and interdigital capacitor for evanescent mode couplings between neighbors. Thus, a microwave device may be provided instead of an optical device.

While the invention has been described with reference to certain embodiments, it will be understood by those skilled in the art that various changes may be made, and equivalents may be substituted for elements thereof to adapt to particular situations without departing from the scope of the disclosure. Therefore, it is intended that the claims are not limited to the particular embodiments disclosed, but that the claims will include all embodiments falling within the scope and spirit of the appended claims.

What is claimed is:

1. A universal photonic apparatus that performs an arbitrary discrete linear unitary operation on a source of light, comprising:

a plurality of waveguides, including:

a plurality of input ports that receive a plurality of first optical signals from a light source;

a plurality of channels positioned in parallel for transmitting the first optical signals along a length of the waveguides; and a plurality of output ports for outputting second optical signals generated from the first optical signals according to a matrix operation; and a plurality of phase shifters constructed and arranged in a cascade structure at the plurality of channels of the waveguides, wherein the unitary matrix reconstruction operation becomes factorized into a plurality of interlaced discrete fractional Fourier transforms (DFrFT) layers and parameter diagonal phase shift layers.

2. The universal photonic apparatus of claim 1, wherein the unitary matrix is an N×N (where N is an integer greater than 1) unitary matrix factorized into alternating discrete fractional Fourier transform (DFrFT) layers and N parameter diagonal phase shift layers.

3. The universal photonic apparatus of claim 2, wherein M layers of phase modulations, each including N phase elements, are sandwiched between M+1 DFrFT layers.

4. The universal photonic apparatus of claim 1, wherein the first optical signals from each channel evanescently couple to adjacent channels, and wherein the matrix operation is performed on a DFrFT matrix, wherein a coupling coefficient κ is between adjacent elements, and wherein the DFrFT matrix is achieved by the coupling coefficient complying with an equation:

$$\kappa_{i,i+1} = \frac{\kappa_0}{2}\sqrt{(N-i)i} \text{ for } i = i, \ldots, N-1.$$

5. The universal photonic apparatus of claim 1, wherein the first optical signals from each channel evanescently couple to adjacent channels using identical single mode waveguides, and wherein the coupling is achieved using different spacings between the waveguides.

6. The universal photonic apparatus of claim 1, wherein the apparatus executes an optimization scheme to identify one or more phase parameters to construct the unitary transformation matrix.

7. The universal photonic apparatus of claim 6, wherein the apparatus performs an auto-calibration operation, wherein perturbations in the DFrFT layers and faulty phase modulators are considered.

8. The universal photonic apparatus of claim 7, wherein the auto-calibration operation includes properties that allow for compensating physical realization errors by tuning the underlying phase parameters.

9. An N-port system, comprising:

a plurality of N ports (N-port system);

a plurality of DFrFTs; and a plurality of diagonal phase shifts, wherein the diagonal phase shifts and DFrFTs are arranged as alternating layers.

10. A photonic integrated circuit comprising:

a plurality of (N+1) phase shifter arrays each comprising N phase shifters;

a plurality of (N+2) waveguide arrays comprising N optical dielectric waveguides that are positioned in parallel and in proximity such that light from each optical dielectric waveguide evanescently couples to adjacent optical dielectric waveguides, the optical dielectric waveguides each having a length (L) given by $$L = \frac{\pi}{2\kappa_0};$$

the proximity being such that coupling coefficients $\kappa_{i,i+1}$ between adjacent optical dielectric waveguides obeys:

$$\kappa_{i,i+1} = \frac{\kappa_0}{2}\sqrt{(N-i)i} \text{ for } i = i, \ldots, N-1;$$

where $\kappa_0$ is a reference coupling value for suitably scaling all coupling coefficients $\kappa_{i,i+1}$ and the length L;

each phase shifter in the plurality of phase shifters is directly cascaded with adjacent waveguide in the plurality of waveguides such that the phase shifters and waveguides alternate.

* * * * *